United States Patent [19]

Currie et al.

[11] Patent Number: 5,150,694
[45] Date of Patent: Sep. 29, 1992

[54] DIESEL ENGINE CLOSED LOOP AIR/FUEL RATIO CONTROL

[75] Inventors: James H. Currie, Rochester; Richard A. Peden, Livonia; David P. Sczomak, Troy; Mark A. Mitchell, Dryden; Michael J. Brown, Utica, all of Mich.

[73] Assignee: General Motors Corporation, Detroit, Mich.

[21] Appl. No.: 796,140

[22] Filed: Nov. 22, 1991

[51] Int. Cl.⁵ .................................. F02M 25/07
[52] U.S. Cl. ..................................... 123/569; 123/571
[58] Field of Search ................ 123/568, 569, 570, 571

[56] References Cited

U.S. PATENT DOCUMENTS

| | | | |
|---|---|---|---|
| 3,963,011 | 6/1976 | Saito et al. | 123/568 |
| 4,373,497 | 2/1983 | Hamren | 123/569 X |
| 4,399,791 | 8/1983 | Kobayashi et al. | 123/489 |
| 4,411,242 | 10/1983 | Igashira et al. | 123/569 |
| 4,455,987 | 6/1984 | Südbeck et al. | 123/569 |
| 4,471,745 | 9/1984 | Yoshioka et al. | 123/569 X |
| 4,483,308 | 11/1984 | Hasegawa | 123/571 |
| 4,553,518 | 11/1985 | Takao et al. | 123/571 X |
| 4,598,684 | 7/1986 | Kato et al. | 123/571 X |
| 4,625,702 | 12/1986 | Onishi | 123/569 X |
| 4,762,107 | 8/1988 | Schöneck et al. | 123/571 X |

Primary Examiner—Willis R. Wolfe
Attorney, Agent, or Firm—Howard N. Conkey

[57] ABSTRACT

The air/fuel ratio of the combustion mixture in the cylinders of an engine is sensed and the sensed air/fuel ratio is controlled to a predetermined scheduled air/fuel ratio by controlling the amount of exhaust gases recirculated. When the exhaust gas recirculated is substantially zero, the air/fuel ratio is thereafter closed loop adjusted to a predetermined scheduled minimum air/fuel ratio when the sensed air/fuel ratio is less than the minimum and when the sensed air/fuel ratio is greater than the minimum while the operator command is at a maximum to thereby provide precise fuel limiting at a predetermined fuel limit schedule.

2 Claims, 3 Drawing Sheets

DIESEL ENGINE CLOSED LOOP AIR/FUEL RATIO CONTROL

BACKGROUND OF THE INVENTION

This invention relates to a diesel engine control system and particularly to a closed loop air/fuel ratio control system for a diesel engine.

It is generally known that emissions of nitrogen oxides from diesel engines can be reduced by recirculating a portion of exhaust gases to the intake of the engine. Current diesel engine exhaust gas recirculation controls provide for control of the amount of exhaust gas recirculation (EGR) based on an open loop schedule. Since the control is open loop, these systems do not provide for active correction for variability due to production tolerances, wear, dirty air filters, fuel, ambient conditions, etc. so that the actual amounts of exhaust gases recirculated may vary from the intended amount.

It is also generally known that the smoke and particulate emissions from a diesel engine may be lessened by preventing the air/fuel ratio from becoming too rich. Typically, this rich limit is imposed by mapping the fuel delivery which is preset prior to delivery of the engine. Thereafter, no active corrections are made for pump wear, fuel viscosity, dirty air filters, ambient changes, etc. so that the actual air/fuel ratio limit may vary from the intended limit.

SUMMARY OF THE INVENTION

This invention provides for an improved diesel engine EGR/fuel control system. More specifically, this invention provides for closed loop control of the air/fuel ratio to a desired schedule of engine operation dependent air/fuel ratios by control of the amount of exhaust gases recirculated to the engine. Further, the air/fuel ratio is closed loop limited to a predetermined schedule of engine operation dependent minimum air/fuel ratios.

According to one aspect of the invention, the air/fuel ratio of the combustion mixture in the engine cylinders is sensed (such as by an exhaust oxygen sensor) and the sensed air/fuel ratio is controlled to a predetermined scheduled air/fuel ratio by controlling the amount of exhaust gases recirculated. When the exhaust gas recirculated has been decreased to substantially zero at which point closed loop control of air/fuel ratio cannot be achieved with control of EGR, the air/fuel ratio is thereafter closed loop adjusted to a predetermined scheduled minimum air/fuel ratio when the sensed air/fuel ratio is less than the minimum and when the sensed air/fuel ratio is greater than the minimum while the operator command is at a maximum to thereby provide precise fuel limiting at a predetermined fuel limit schedule.

DESCRIPTION OF THE DRAWINGS

The invention may be best understood by reference to the following description of a preferred embodiment and the drawings in which.

DESCRIPTION OF A PREFERRED EMBODIMENT

Figure 1:
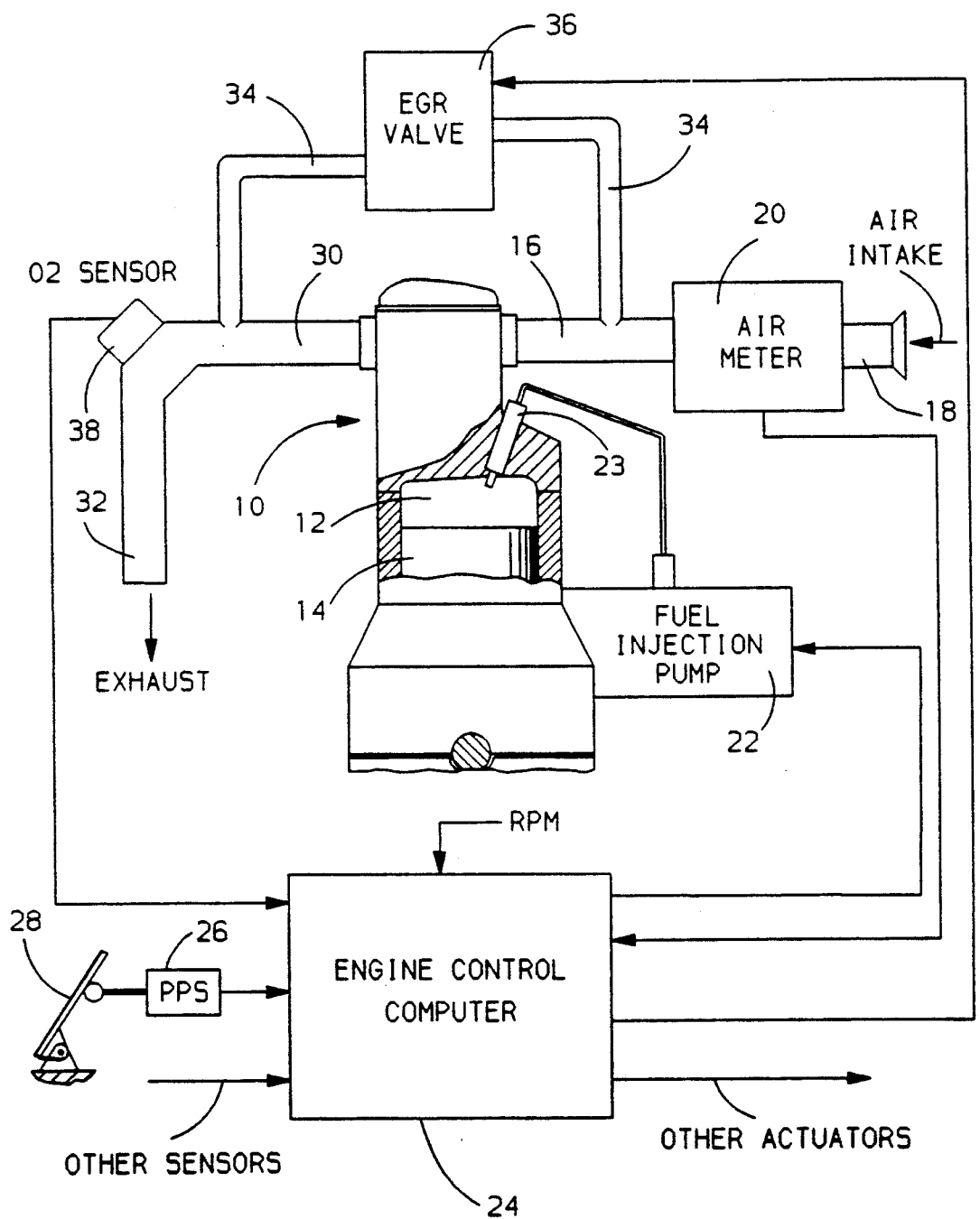
FIG. 1 is a general diagram of a diesel engine control system.

Referring to FIG. 1, a diesel engine 10 is illustrated. A single cylinder of the engine is shown for illustration purposes, it being understood that the engine may have any number of cylinders as desired. The cylinder illustrated includes a combustion space 12 and piston 14. Air is drawn into the combustion space 12 during engine operation from an intake manifold 16 that is open to the atmosphere via an air intake conduit 18. The air intake 18 includes an air meter 20 for providing a measure of the mass air flow into the engine 10. The air intake 18 is unthrottled so that the pressure in the intake manifold 16 is substantially at atmospheric pressure.

Fuel is metered into the cylinders of the engine by means of a solenoid controlled fuel pump that delivers fuel pulses timed to engine rotation sequentially to fuel injectors such as the injector 23 delivering fuel to the combustion space 12. The injection pump 22 is controlled to control the amount of fuel metered with each injection event by an engine control computer 24. In general, the fuel quantity is primarily controlled by the computer 24 in response to a fuel request input from the driver of the vehicle. This input is provided by a pedal position sensor 26 that monitors the position of the operator positioned accelerator pedal 28.

The exhaust gases resulting from the combustion events in the cylinders of the engine 10 are discharged into an exhaust manifold 30 and thereafter into the atmosphere via an exhaust conduit 32.

The engine 10 further provides for controlled recirculation of exhaust gases from the exhaust manifold 30 to the intake manifold 16 in order to reduce the amount of $NO_x$ in the exhaust gases discharged into the atmosphere. Accordingly, a conduit 34 is provided for directing exhaust gases from the exhaust manifold 30 to the intake manifold 16. The conduit 34 includes a normally closed electromagnetic valve 36 for regulating the amount of exhaust gases recirculated. This valve is controlled by the computer 24 such as by means of a pulse width or duty cycle modulated signal to control the position of the valve to establish the desired amount of EGR. In general, the valve 36 is controlled by the computer 24 so as to achieve a predetermined scheduled air/fuel ratio as will be described.

An exhaust gas sensor 38 is positioned in the exhaust manifold to monitor the air/fuel ratio of the mixture of air and fuel in the combustion space of the cylinders. The sensor 38 is of the type that provides an output that is a measure of air/fuel ratio over a wide range of ratios including the ratios of interest in operation of the diesel engine 10. This air/fuel ratio signal is provided to the computer 24 to enable closed loop control of air fuel ratio in accord with this invention as will be described.

An engine speed signal RPM is also provided to the computer 24. This signal may be provided by a conventional toothed wheel driven by the engine output shaft and an electromagnetic pickup. The resulting signal has a frequency that is a measure of engine speed.

The computer also receives inputs from other sensors as required such as engine position, coolant temperature, etc. as is common in diesel engine controls. Similarly, a number of other actuators, not related to this invention, such as the engine glow plug heating system, can be controlled by the computer 24.

The engine control computer 24 takes the form of a standard digital computer. The principles of this invention are implemented in the form of an operating program stored in the computer's memory. This program is illustrated in FIGS. 2a and 2b and takes the form of an A/F feedback control interrupt routine executed by the computer 24 at interrupt intervals established by a once per cylinder timing signal.

Figure 2A:
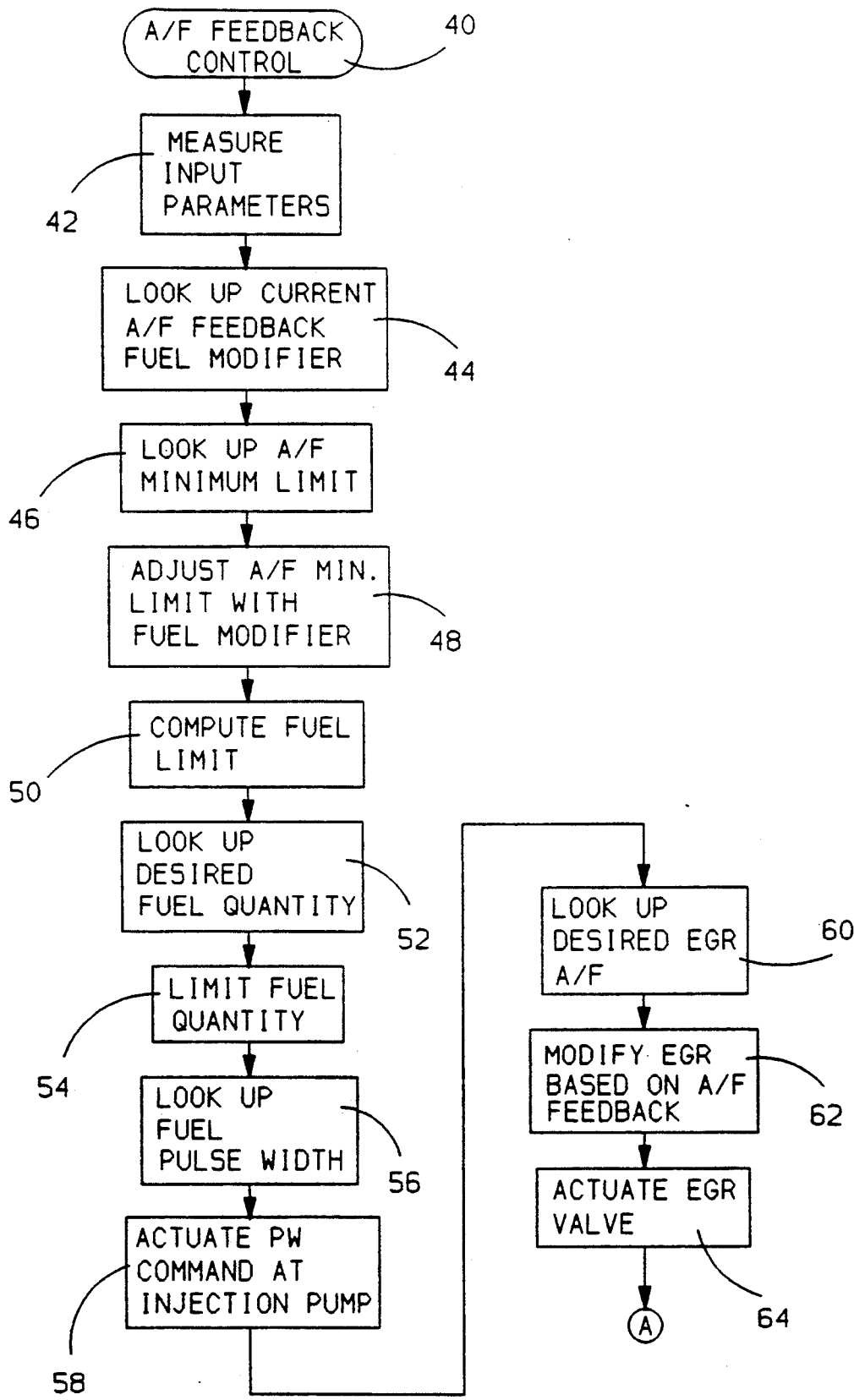
FIGS. 2a and 2b are flow diagrams illustrating the operation of the system of FIG. 1 in accord with the principles of this invention.
Figure 2B:
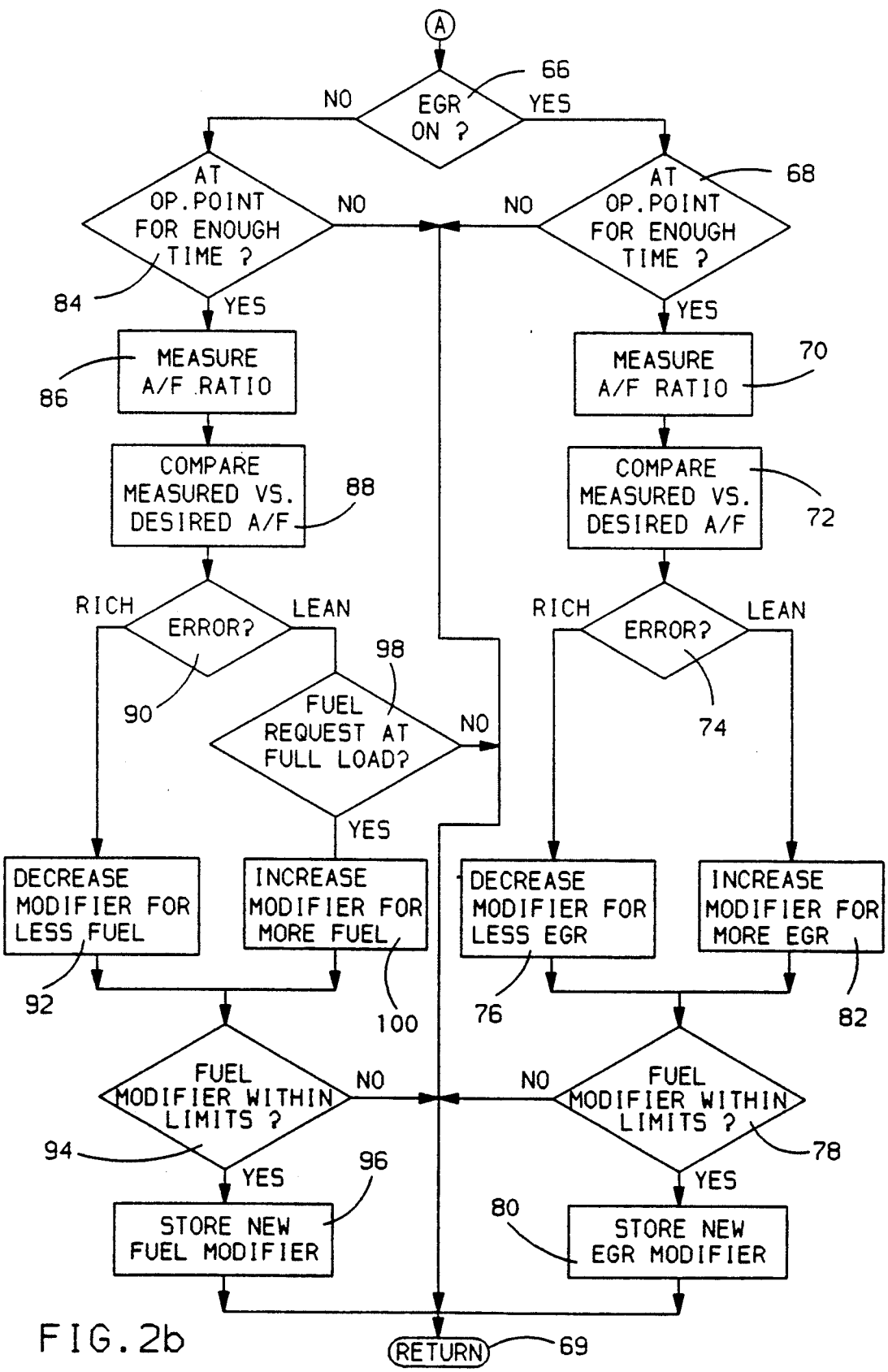

Referring to FIGS. 2a and 2b, the A/F feedback control routine is entered at step 40 and proceeds to step 42 where the various input parameters required for fuel and EGR control are read and stored in memory. These signals include the signal from the air meter 20 providing a measure of the mass air flow, the vehicle operator load command output of the pedal position sensor 26, and the output of the exhaust oxygen sensor providing a measure of the engine air/fuel ratio. The operator load command is converted to a percentage of maximum pedal position and is referred to as the fuel request (FR) percent. Further, this step determines and stores in memory engine speed from the engine speed signal RPM.

The routine next determines the fuel quantity to be injected into each cylinder of the engine. In general, the fuel quantity is a predetermined function of FR percent and engine speed and closed loop limited at a minimum air/fuel ratio value that is a predetermined function of engine speed. First an air/fuel ratio feedback fuel modifier (AFFM) is retrieved at step 44 from a two dimensional AFFM lookup table storing such modifiers as a function of engine speed. In this regard, the engine speed range is divided into a predetermined number of individual operating speed regions hereafter called operating speed points. The AFFM lookup table includes a same number of memory locations each being associated with a respective one of the operating speed points and having stored therein an AFFM associated with the corresponding operating speed point. The AFFM lookup table is addressed by the measured value of engine speed to retrieve the AFFM corresponding to the engine operating speed point defined by the measured speed value.

At step 46, a predetermined air/fuel ratio minimum limit is retrieved from a read only memory lookup table storing minimum allowable air/fuel ratio values as a predetermined function of engine speed. These engine calibration values are determine through engine development to provide desired engine performance objectives including, for example, exhaust particulate emissions. The air/fuel ratio minimum limit retrieved from memory at the location defined by engine speed stored at step 42 is next adjusted by summing with it the air/fuel ratio feedback modifier retrieved from memory at step 44.

Step 50 then determines the fuel quantity associated with the adjusted air/fuel minimum limit. This is simply the computation of the amount of fuel quantity at the mass air flow stored at step 42 to establish the adjusted air/fuel ratio minimum limit. This computed fuel quantity represents the maximum allowable amount of fuel to be injected.

Step 52 next determines the desired fuel quantity from a lookup table storing a schedule of fuel quantities as a predetermined function of the FR percent and engine speed. This desired fuel quantity may be adjusted at this step, if desired, as a function of conventional parameters such as engine temperature, engine transients, etc. Step 54 then limits, if required, the determined fuel quantity at the limit established at step 50.

The fuel pulse width required to inject the desired fuel quantity (as limited by step 50) is determined at step 56 from a read only memory calibration lookup table of pulse width values as a predetermined function of fuel quantity and engine speed. Finally, step 58 provides for actuating the fuel pump in accord with the determined fuel pulse width.

The AFFM value stored at each AFFM memory location referred to in relation to step 44 is updated in response to the air/fuel ratio sensor 38 as will be described while the engine operates at the corresponding speed operating point as the engine goes through its service life so that the AFFM's stored in the AFFM lookup table provide closed loop air/fuel ratio adjustment of the fuel quantity injected into the engine 10 in accord with step 58 so as to precisely limit the air/fuel ratio at the desired minimum limit value.

The routine next provides for controlling the EGR valve to control the amount of exhaust gases recirculated from the exhaust manifold 30 to the intake manifold 16. The EGR amount is established based upon a desired air/fuel ratio that is a predetermined function of the fuel quantity injected and engine speed and closed loop adjusted based upon the feedback signal from the exhaust oxygen sensor 38. First the desired air/fuel ratio is determined at step 60 from a lookup table of calibration air/fuel ratios stored in read only memory as a predetermined function of engine speed and fuel quantity determined in the preceding steps. This schedule is determined through engine development to achieve desired operating characteristics such as reduced $NO_x$ content in the exhaust gases. The air/fuel ratio retrieved from memory at the memory location corresponding to the engine speed and fuel quantity may be modified, if necessary, for basic engine operating conditions such as coolant temperature or transient conditions.

The EGR air/fuel ratio is then modified at step 62 by summing the EGR air/fuel ratio with an air/fuel ratio feedback EGR modifier (AFEM) retrieved from a three dimensional AFEM lookup table storing such modifiers as a function of fuel quantity and engine speed. In this regard, the engine operating range defined by fuel amount and engine speed is divided into a predetermined number of individual operating regions hereafter referred to as operating points. The AFEM lookup table includes a same number of memory locations each being associated with a respective one of the operating points and having stored therein an AFEM associated with the corresponding operating point. The AFEM lookup table is addressed by the fuel quantity established at steps 52 and 54 and the measured value of engine speed to retrieve the AFEM corresponding to the engine operating point defined by those fuel quantity and engine speed values.

The AFEM value stored at each AFEM memory location is updated in response to the air/fuel ratio sensor 38 as will be described while the engine operates at the corresponding operating point as the engine goes through its service life so that the AFEM's stored in the AFEM lookup table provide closed loop air/fuel ratio adjustment of the EGR amount so as to precisely control the air/fuel ratio at the desired value. The modifiers are corrected as will be described on a continual basis in response to the feedback of the air/fuel ratio by the sensor 38 so that the desired air/fuel ratio is precisely obtained.

At step 64, the air/fuel ratio represented by the measured mass air flow and the fuel quantity injected via steps 44-58 is determined and compared to the modified air/fuel ratio determined by step 62 and the duty cycle of the signal to the EGR valve 36 is adjusted in direction to restore the determined air/fuel ratio at the modified air/fuel ratio. By continually closed loop adjusting the modifiers used at step 62 in response to the actual air/fuel ratio sensed by the sensor 38, the resulting actual air/fuel ratio in the combustion chambers will be established at the predetermined desired air/fuel ratio.

The routine next functions to update the AFFM and AFEM modifiers in response to the exhaust oxygen sensor 38 output to provide closed loop control of the air/fuel ratio at the scheduled air/fuel ratios.

In general, the AFEM values are updated if EGR is on and the AFFM values are updated if EGR is off. The EGR on/off condition is sensed at step 66 and may be based on the state of the EGR control signal established via steps 60-64. If the duty cycle of the signal applied to the EGR valve is greater than zero, EGR is considered on and the EGR air/fuel ratio modifiers AFEM are adjusted. When this condition is sensed at step 66, the program determines at step 68 if the engine has been operating at the same operating point for a predetermined period of time which accounts for any system time lag and ensures that the engine is in a stable operating condition. The AFEM's are updated only when this condition is met. If not met, the program exits the routine at step 69.

If a stable operating condition is determined at step 68, the actual measured air/fuel ratio indicated by the output of the exhaust oxygen sensor 38 is determined at step 70 and then compared with a desired air/fuel ratio. The desired air/fuel ratio may be obtained from the same lookup table of calibration air/fuel ratios used at step 60 for EGR control or may be obtained from a separate lookup table establishing a corresponding schedule but having fewer memory locations. In this case, the engine operating range represented by fuel amount and engine speed is divided into fewer operating regions, or points, each corresponding to one of the lookup table memory locations. In either case, the desired air/fuel ratio is retrieved from memory at the location addressed by the fuel quantity and measured engine speed.

If the next step 74 determines the actual air/fuel ratio is rich relative to the desired air/fuel ratio, step 76 first addresses the AFEM lookup table by the last determined values of fuel quantity and engine speed to retrieve the current value of the AFEM for the engine operating point defined by those values and then decreases that modifier to effect a decrease in the EGR amount via step 62. If the next step 78 determines that the adjusted modifier is within calibration limits, the adjusted modifier is stored at step 80 in the AFEM lookup table at the same memory location at which the original value was retrieved.

Returning to step 74, if the comparison of step 72 indicates the actual air/fuel ratio is lean relative to the desired air/fuel ratio, step 82 addresses the AFEM lookup table by the last determined values of fuel quantity and engine speed to retrieve the current value of the AFEM for the engine operating point defined by those values and then increases that modifier to effect an increase in the EGR amount via step 62. If step 78 indicates that the adjusted value is within limits, the adjusted AFEM is stored at the same memory location at which the original value was retrieved.

Returning to step 66, if it is determined that EGR is off, the air/fuel feedback fuel modifiers are updated based on the output of the exhaust oxygen sensor 38. This routine begins at step 84 where the program determines if the engine is in a stable operating condition in the same manner as described relative to step 68. If not, the program exits at step 69. If a stable operating condition is determined, the actual air/fuel ratio represented by the output of the exhaust oxygen sensor 38 is determined at step 86 and then compared at step 88 with the desired air/fuel ratio. The desired air/fuel ratio may be obtained from the same lookup table of calibration air/fuel ratio minimum limits used at step 46 for fuel control or may be obtained from a separate lookup table establishing a corresponding schedule but having fewer memory locations. In this case, the engine operating speed range is divided into fewer operating regions, or points, each corresponding to one of the lookup table memory locations. In either case, the desired air/fuel ratio is retrieved from memory at the location addressed by measured engine speed.

Step 90 then determines if the comparison of step 88 indicates a rich or lean combustion condition relative to the desired air/fuel ratio. If rich, step 92 first addresses the AFFM lookup table by the last measured value of engine speed to retrieve the current value of the AFFM for the engine operating point defined by that speed and then decreases that modifier to effect a decrease in the fuel amount when the limit is applied at step 54. If the next step 94 determines that the modifier is within calibration limits, the adjusted modifier is stored at step 96 in the AFFM lookup table at the same memory location from which the original AFFM was retrieved. Otherwise, the step 96 is bypassed and the routine exits at step 69.

Returning to step 90, if the comparison of step 88 indicates a lean air/fuel ratio relative to the desired air/fuel ratio, the AFFM is updated to increase fuel only if the operator is commanding full load as represented, for example by the fuel request percent being at a high value such as 95%. This condition is determined at step 98. If full load is being commanded, a step 100 first addresses the AFFM lookup table by the last measured value of engine speed to retrieve the current value of the AFFM for the engine operating point defined by that speed and then increases that modifier to effect an increase in the fuel quantity when the limit is applied at step 54. If step 94 indicates that the adjusted modifier is within limits it is stored at the same lookup table address from which the original value was obtained, otherwise step 96 is bypassed.

In the foregoing manner, the AFFM's are continuously updated in direction to restore the air/fuel ratio at the desired minimum limit.

While a specific preferred embodiment has been described, it is understood that many modifications may be made by the exercise of skill in the art without departing from the scope of the invention.

The embodiments of the invention in which an exclusive property or privilege is claimed are defined as follows:

1. A method of controlling the air/fuel ratio in a diesel engine having an intake space coupled to atmosphere and from which air is drawn into cylinders of the engine, an exhaust passage into which exhaust gases are discharged from the cylinders, fuel injectors for injecting fuel into the cylinders to establish an air and fuel mixture to undergo combustion, and EGR means for recirculating a portion of the exhaust gases from the exhaust passage into the intake space, the EGR means including a valve operable between closed and full open for regulating the amount of exhaust gases recirculated, the method comprising the steps of:

sensing the air/fuel ratio of the cylinder air and fuel mixture;

storing (A) a first schedule of air/fuel ratio values as a predetermined function of a first engine operating condition and (B) a second schedule of air/fuel ratios as a predetermined function of a second predetermined engine operating condition;

controlling the fuel injectors to inject a fuel amount to each cylinder in accord with an operator fuel request;

determining if the EGR valve is closed;

when the EGR valve is not closed, (A) sensing the second engine operating condition and (B) adjusting the EGR valve in direction to vary the amount of exhaust gases recirculated to restore the sensed air/fuel ratio to the air/fuel ratio in the second schedule corresponding to the sensed second engine operating condition; and when the EGR valve is closed, (A) sensing the first engine operating condition, (B) determining if the sensed air/fuel ratio is rich or lean relative to the air/fuel ratio in the first schedule corresponding to the sensed first engine operating condition, (C) when the sensed air/fuel ratio is determined to be rich, decreasing the fuel amount injected by the injectors to restore the sensed air/fuel ratio to the air/fuel ratio in the first schedule corresponding to the sensed first engine operating condition, and (D) when the sensed air/fuel ratio is determined to be lean, increasing the fuel amount injected by the injectors to restore the sensed air/fuel ratio to the air/fuel ratio in the first schedule corresponding to the sensed first engine operating condition only when the operator fuel request is at a predetermined maximum.

2. A method of controlling the air/fuel ratio in a diesel engine having an intake space coupled to atmosphere and from which air is drawn into cylinders of the engine, an exhaust passage into which exhaust gases are discharged from the cylinders, fuel injectors for injecting fuel into the cylinders to establish an air and fuel mixture to undergo combustion, and EGR means for recirculating a portion of the exhaust gases from the exhaust passage into the intake space, the EGR means including a valve operable between closed and full open for regulating the amount of exhaust gases recirculated, the method comprising the steps of:

controlling the fuel injectors to inject a fuel amount to each cylinder in accord with an operator fuel request;

sensing engine speed;

sensing the air/fuel ratio of the cylinder air and fuel mixture;

storing (A) a first schedule of air/fuel ratio values as a predetermined function of engine speed and (B) a second schedule of air/fuel ratios as a predetermined function of engine speed and fuel amount injected;

determining if the EGR valve is closed;

when the EGR valve is not closed, adjusting the EGR valve in direction to vary the amount of exhaust gases recirculated to restore the sensed air/fuel ratio to the air/fuel ratio in the second schedule corresponding to the sensed engine speed; and when the EGR valve is closed, (A) determining if the sensed air/fuel ratio is rich or lean relative to the air/fuel ratio in the first schedule corresponding to the sensed engine speed, (B) when the sensed air/fuel ratio is determined to be rich, decreasing the fuel amount injected by the injectors to restore the sensed air/fuel ratio to the air/fuel ratio in the first schedule corresponding to the sensed engine speed, and (C) when the sensed air/fuel ratio is determined to be lean, increasing the fuel amount injected by the injectors to restore the sensed air/fuel ratio to the air/fuel ratio in the first schedule corresponding to the sensed engine speed only when the operator fuel request is at a predetermined maximum.

* * * * *